Patented Apr. 21, 1953

2,636,032

UNITED STATES PATENT OFFICE 2,636,032

N,N'-DISUBSTITUTED PIPERAZINES AND PROCESS OF PREPARING SAME

Arthur W. Weston, Waukegan, and Kenneth E. Hamlin, Jr., Gurnee, Ill., assignors to Abbott Laboratories, North Chicago, Ill., a corporation of Illinois No Drawing. Application April 12, 1949, Serial No. 87,116

20 Claims. (Cl. 260—268)

Our invention relates to new chemical compounds and more particularly to certain heterocyclic compounds, containing as the essential constituent a N,N'-disubstituted piperazine ring and salts thereof.

The novel compounds of our invention are variously useful. It has been observed that the compounds claimed herein according to the invention show antihistaminic and antispasmodic activity.

The present invention comprises novel compounds containing the piperazine ring and having the following formula:

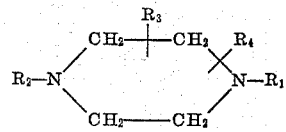

wherein $R_1$ is hydrogen, an alkyl group containing up to four carbon atoms inclusive or a hydroxyalkyl group containing up to four carbon atoms inclusive; $R_2$ is a benzhydrylmethyl including substituted benzhydrylmethyl groups, naphthylmethyl, fluorenyl, phenanthrylmethyl, diphenylallyl group; $R_3$, $R_4$ are hydrogen atoms or a lower alkyl group containing up to four carbon atoms inclusive.

The compounds according to the invention may be prepared by treating:

(1) An $R_1$-piperazine

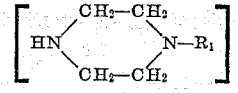

with a compound of the formula $R_2$-X, wherein X is a chlorine, bromine or iodine atom;

(2) The treatment of piperazine with a compound of the formula $R_2$-X, followed by treatment of the reaction product with a compound of the formula $R_1X$;

(3) Treatment of an N-$R_2$-morpholine of the formula:

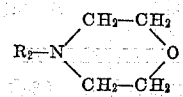

with the $R_1$-amine under pressure;

(4) Treatment of an N-$R_2$-$\beta,\beta'$-dihalodiethylamine or an N-($R_2CH_2$)-$\beta,\beta'$-dihydroxydiethylamine with the formula:

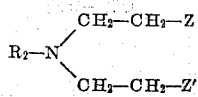

with an $R_1$-amine. In the above formula Z and Z' are either halogen or hydroxy groups;

(5) Treatment of an N-$R_2$-$\beta,\beta'$-diaminodiethylamine of the formula:

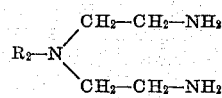

under such conditions of heating as will cause ammonia to split out of the molecule. The group $R_1$- may be introduced by treating the resulting $R_2$-piperazine compound with an $R_1X$;

(6) Treatment of an N-$R_2$-$\beta$-hydroxy-$\beta'$-aminodiethylamine of the formula:

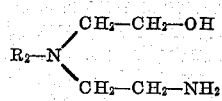

under such conditions of heating as will cause a molecule of water to split out of the intermediate. The $R_1$- group may be introduced by treating the resulting $R_2$-piperazine with an $R_1X$.

(7) Treatment of an N-$R_2$-$\beta,\beta'$-di-$R_1$-diaminodiethylamine of the formula:

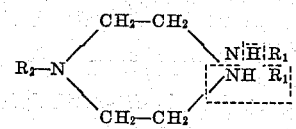

under such conditions of heating as will cause $R_1$-amine to split out and form the corresponding N-$R_1$-N'-$R_2$-piperazine;

(8) Treatment of an $R_2$-amine with an N-$R_1\beta,\beta'$-dihalodiethylamine as indicated by the following reaction:

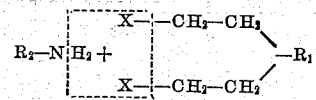

to split out two moles of hydrohalic acid and produce the corresponding N-$R_1$-N'-$R_2$-piperazine;

(9) The final compounds of the invention may also be prepared where $R_1$ is methyl or ethyl from an N-$R_2$-piperazine, by reacting this compound with either formaldehyde or acetaldehyde in conjunction with formic acid in which case the substituted $R_1$ is methyl or ethyl, respectively. The polymer of formaldehyde, paraformaldehyde or formalin, may be used in place of formaldehyde;

(10) Treatment of an N-monoacyl derivative of piperazine in which the acyl group contains up to four carbon atoms inclusive, with an $R_2$-halide followed by reduction of the acyl group to the corresponding alkyl group with a reducing agent such as formic acid or lithium aluminum hydride.

The $R_2$-piperazines which are both valuable therapeutics and also valuable intermediates for the preparation of those final compounds of the invention wherein $R_1$ is other than a hydrogen atom, may be prepared by reacting an N-carbethoxypiperazine with a compound of the formula $R_2$-X to produce the corresponding N-$R_2$-N'-carbethoxypiperazine. This product is then hydrolyzed and decarboxylated to produce the desired N-$R_2$-piperazine.

In our process (3) above the N-$R_2$-morpholine may be produced by two processes: (a) reaction of an $R_2$-halide with morpholine; (b) the treatment of an $R_2$-amine with a $\beta,\beta'$-dihalodiethylether.

In process (4) above, the compound N,N-($\beta,\beta'$-dihalodiethyl)-N-$R_2$-amine has been prepared by reacting diethanolamine with an $R_2$-halide to produce the N-$R_2$-diethanolamine. This compound is then treated with hydrohalic acid to produce the desired dihalide. One may also use the N-$R_2$-diethanolamine directly with the $R_1$-amine to obtain results which are moderately satisfactory.

In the above formulae $R_1$, $R_2$ and X have the same definitions as given previously. In methods (1) and (2) the presence of an alkaline material to neutralize the acid formed from the reaction may be advantageous. The presence of a trace of an alkali-metal iodide such as sodium iodide, in these two methods negates the necessity of a longer refluxing period. It has also been found advantageous to carry out these processes in an alkanol solvent such as butanol.

In preparing the compounds of the invention it is obvious that one may introduce either of the two nitrogen substituents last to come within the scope of the present invention.

Our invention also comprises the novel process illustrated above for preparing the N,N'-substituted piperazine of the invention.

The invention may be illustrated by the following examples:

EXAMPLE I

N-($\beta,\beta$-diphenylethyl)-N'-methylpiperazine

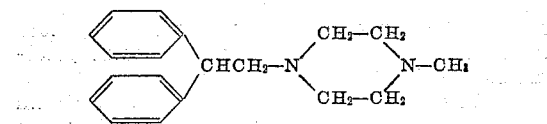

By employing about 10.8 g. of $\beta,\beta$-diphenylethyl chloride, 5.0 g. N-methylpiperazine and 5.3 g. of anhydrous sodium carbonate in 100 cc. of dry xylene and refluxing the mixture for 60 hours, there is obtained the product represented by the above structural formula. By adding two equivalents of hydrogen chloride gas to an absolute alcohol solution of this base, the dihydrochloride salt of the above base is formed. This compound melts at 278–279° C. after crystallization from alcohol.

EXAMPLE II

N-($\alpha$-naphthylmethyl)-piperazine

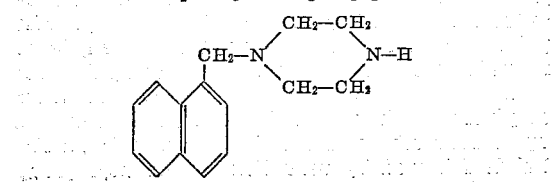

A solution of 8.6 g. of anhydrous piperazine and 17.7 g. of $\alpha$-chloromethylnaphthalene in 150 cc. of anhydrous ethanol is allowed to stand 17 hours. On filtration N,N'-di($\alpha$-naphthylmethyl)-piperazine, M. P. 163–164° C. (from ethanol), is recovered.

After concentrating the filtrate in vacuo and making the residue alkaline with a sodium hydroxide solution, the mixture is extracted with ether. After drying, the mixture is distilled, N-($\alpha$-naphthylmethyl)-piperazine, B. P. 154–156° C. at 1 mm. is obtained. The monohydrochloride of this base melts at 227–228° C.

EXAMPLE III

N-($\beta$-naphthylmethyl)-piperazine

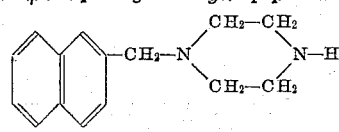

In a manner similar to that of Example II, 8.6 g. of anhydrous piperazine and 17.7 g. of $\beta$-chloromethylnaphthalene is converted to N,N'-di-($\beta$-naphthylmethyl)-piperazine, M. P. 159–160° C. (from ethanol) and N-($\beta$-naphthylmethyl)-piperazine, B. P. 155–160° C. at 1 mm. The latter compound on treatment with hydrogen chloride yields a monohydrochloride, M. P. 193–195° C.

EXAMPLE IV

N-($\alpha$-naphthylmethyl)-N'-methylpiperazine

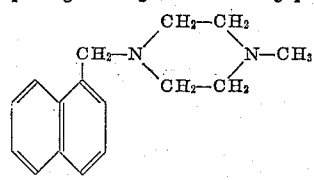

To a cooled solution of 16 cc. of formic acid and 3.2 cc. of formalin (formaldehyde) is added 5 g. of N-($\alpha$-naphthylmethyl)-piperazine. The mixture is heated on a steam bath for 8 hours. Concentrated hydrochloric acid is then added to make the mixture acidic and the resulting solution is evaporated to dryness in vacuo. The dihydrochloride of N-($\alpha$-naphthylmethyl)-N'-methylpiperazine isolated from this residue has a melting point of 241° C. (with decomposition) from ethanol.

EXAMPLE V

N-($\beta$-naphthylmethyl)-N'-methylpiperazine

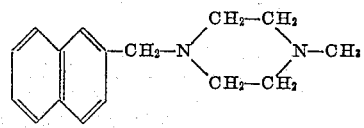

In a manner similar to that of Example IV, 4 g. of N-($\beta$-naphthylmethyl)-piperazine, 12.5 cc. of formic acid and 2.5 cc. of formalin are reacted to yield the dihydrochloride of N-($\beta$-naphthylmethyl)-N'-methylpiperazine, M. P. 281° C. (with decomposition) when crystallized from ethanol.

EXAMPLE VI

N-($\alpha$-naphthylmethyl)-N'-($\beta$-hydroxyethyl)-piperazine

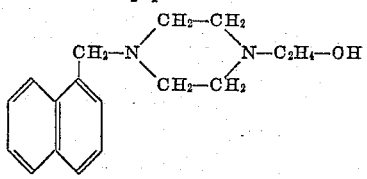

In a manner similar to that of Example I, 6.5 g. of N-(β-hydroxyethyl)-piperazine, 14 g. of α-chloromethylnaphthalene, 5.3 g. of sodium carbonate and 100 cc. of xylene are combined to yield the dihydrochloride of N-(α-naphthylmethyl)-N'-(β-hydroxyethyl)-piperazine, M. P. 205–206° C. (with decomposition).

EXAMPLE VII

N-(β-naphthylmethyl)-N'-(β-hydroxyethyl)-piperazine

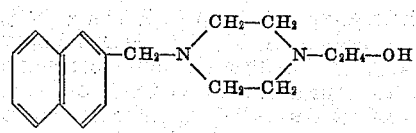

In a fashion similar to that of Example I, 3.25 g. of N-(β-hydroxyethyl)-piperazine and 4.66 g. of β-chloromethylnaphthalene are reacted with n-butanol replacing the hydrocarbon solvent. The product is isolated as the dihydrochloride, having a melting point of 241° C. (with decomposition).

EXAMPLE VIII

N-(9-fluorenyl)-N'-(β-hydroxyethyl)-piperazine

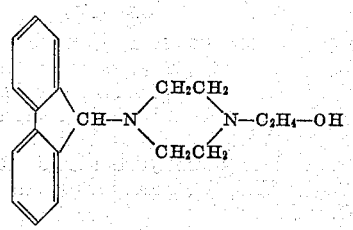

In a manner similar to that of Example I, 12 g. of 9-bromofluorene and 6.5 g. of N-(β-hydroxyethyl)-piperazine in butanol are heated on a steam bath for two hours to yield the hydrobromide of N-(9-fluorenyl)-N'-(β-hydroxyethyl)-piperazine. This compound is converted to the free base, M. P. 143–144° C. (from ethyl acetate) and the dihydrochloride, M. P. 243–244° C. (with decomposition).

EXAMPLE IX

N-(9-fluorenyl)-piperazine

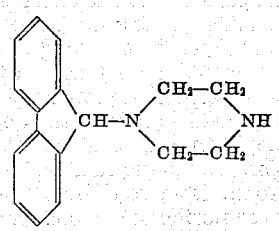

A mixture of 10 g. of N-(9-fluorenyl)-N'-carbethoxypiperazine and 100 cc. of concentrated hydrochloric acid are refluxed for several hours. The solution is then evaporated to dryness in vacuo. After dissolving the residue in 75 cc. of warm water, 40% potassium hydroxide solution is added to liberate the free base as an oily supernatant layer. This layer is separated, dried carefully over potassium hydroxide pellets, and distilled. The base is treated with alcoholic hydrogen chloride to produce the dihydrochloride of N-(9-fluorenyl)-piperazine having a melting point of 283–285° C. (with decomposition) after crystallization from ethanol.

EXAMPLE X

N-(9-fluorenyl)-N'-methylpiperazine

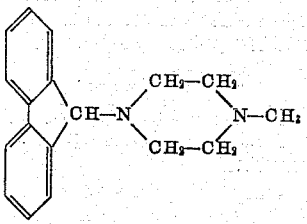

In a similar manner to that of Example I, 12 g. of 9-bromofluorene and 5 g. of N-methylpiperazine in 100 cc. butanol are heated 2½ hours on a steam bath to yield 7.5 g. of the dihydrobromide of N-(9-fluorenyl)-N'-methylpiperazine, M. P. 265–268° C. (with decomposition) after crystallization from ethanol.

EXAMPLE XI

N-(9-phenanthrylmethyl)-N'-methylpiperazine

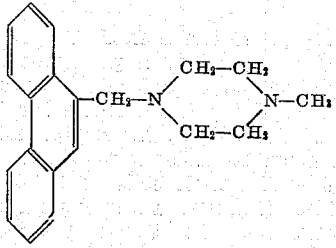

In a similar manner to that of Example I, 7.4 g. of 9-chloromethylphenanthrene and 3.2 g. of N-methylpiperazine in 75 cc. of butanol are heated 2½ hours on a steam bath to yield the dihydrochloride of N-(9-phenanthryl)-N'-methylpiperazine, M. P. 254–255° C. (with decomposition) after crystallization from ethanol.

EXAMPLE XII

N-phenyl-N'-methylpiperazine methiodide

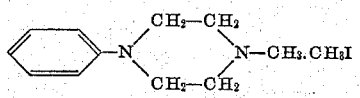

To 5.3 g. of N-phenyl-N'-methylpiperazine dissolved in ether is added 4.3 g. of methyl iodide. The resulting compound having the above structural formula melts at 234–235° C. after recrystallization from alcohol.

EXAMPLE XIII

N-(p-chlorobenzhydryl)-N'-methyl-2-methylpiperazine or N-(p-chlorobenzhydryl)-N'-methyl-3-methylpiperazine

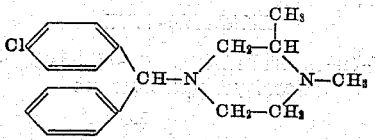

or

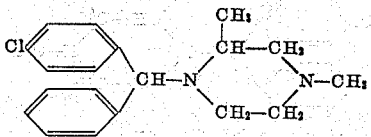

Following the procedure of Example I, 13.4 g. of 1,2-dimethylpiperazine or 1,3-dimethylpiperazine, 28 g. of p-chlorobenzhydryl chloride, and 12 g. of anhydrous sodium carbonate in 110 cc. of dry xylene are refluxed for 64 hours to produce the compound represented by one of the structures above. The product is a very viscous, light amber oil which boils at 152–153° C. at 0.3 mm. The base forms a dipicrate in ether which recrystallizes from ethanol as yellow granules, melting point 194–195° C. (dec.)

EXAMPLE XIV

*1,3,5-trimethyl-4-(p-chlorobenzhydryl)-piperazine or 1,2,6-trimethyl-4-(p-chlorobenzhydryl)-piperazine*

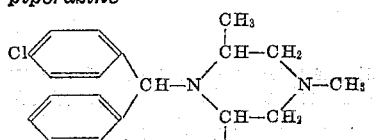

or

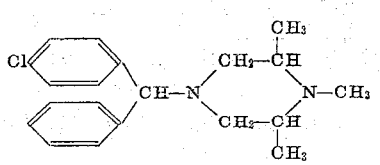

Using 11.7 g. of the compound prepared in Example XXXIV, 21.7 g. of p-chlorobenzhydryl chloride, and 9.7 g. of anhydrous sodium carbonate, and refluxing the mixture for 26 hours in 100 cc. of dry xylene, the compound having one of the above formulas is obtained as a very viscous yellow oil which boils at 177–178° C. at 1.4 mm. The oil sets to a sticky solid after sitting several weeks. The base forms a dipicrate in ether which recrystallizes from methanol as bright yellow needles which melt at 214–215° C. (dec.).

EXAMPLE XV

*N-(p-chlorobenzhydryl)-N'-methyl-2,5-dimethylpiperazine*

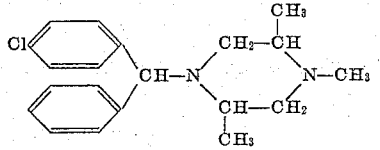

In the manner of Example I, 4.1 g. of 1,2,5-trimethylpiperazine and 7.6 g. of p-chlorobenzhydryl chloride are condensed by refluxing in 75 cc. of dry xylene in the presence of 3.4 g. of anhydrous sodium carbonate for 48 hours. The product, represented by the formula above, is collected as a very viscous yellow oil which boils at 150–160° C. at 1 mm. The base forms a monopicrate in ether which recrystallizes from ethanol as yellow needles melting at 181–182° C. (dec.).

EXAMPLE XVI

*N-(p-chlorobenzhydryl)-N'-methyl-decahydroquinoxaline*

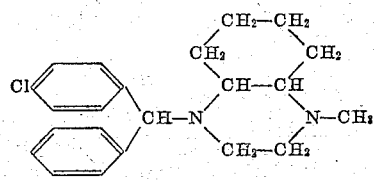

In the manner of Example I, 8.9 g. of N-methyldecahydroquinoxaline, 13.7 g. of p-chlorobenzhydryl chloride, and 6.2 g. of anhydrous sodium carbonate are refluxed in 55 cc. of dry xylene for 46 hours to produce the compound represented by the formula above. The product is a very viscous oil which boils at 196° C. at 0.6 mm. It forms a dipicrate in ether which recrystallizes from absolute ethanol as yellow crystals which begin turning dark at 169° C. and melt at 263° C. (dec.).

EXAMPLE XVII

*N-(γ,γ-diphenylallyl)-N'-methylpiperazine*

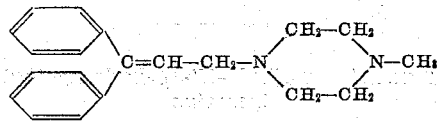

In the manner of Example I, 11.4 g. of γ,γ-diphenylallyl chloride, 5 g. of N-methylpiperazine and 5.3 g. of anhydrous sodium carbonate are reacted to form a product of the above structure which boils at 170–173° C. at 0.9 mm. The monohydrate of the monohydrochloride salt melts at 86–87° C. after crystallization from alcohol; the non-hydrated monohydrochloride melts at 139–140° C.

EXAMPLE XVIII

*N-(α-propyl-p-chlorobenzyl)-N'-methylpiperazine*

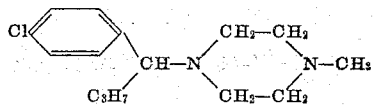

By employing about 10.2 g. of α-propyl-p-chlorobenzyl chloride, 5.0 g. of N-methylpiperazine, 5.3 g. of anhydrous sodium carbonate and by following the procedure of Example I, the above product is obtained. It boils at 142–143° C. at 1.7 mm. The monohydrochloride salt melts at 176–177° C. The dihydrochloride salt melts at 256–257° C. (dec.).

EXAMPLE XIX

*N-(α-pyridyl)-piperazine*

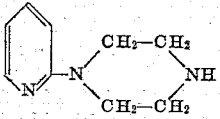

A mixture of 31.6 g. (0.2 mole) of α-bromopyridine, 34.4 g. (0.2 mole) of anhydrous piperazine and 20 g. of pyridine is heated in a bomb at 155° C. for six hours. The reaction mixture is then heated on the steam bath with 10 g. of solid sodium hydroxide for a short time, cooled and ice water added to dissolve all the solid material. The oily layer is separated and combined with the subsequent ether extracts of the aqueous portion. The oil which remains after removal of the ether is distilled. There is thus obtained the desired product boiling at 114–116° C. at 1.4 mm.

The addition of an equivalent of hydrogen chloride gas to an ether solution of the base gives the monohydrochloride salt which melts at 232–233° C. (dec.). The dihydrochloride salt has M. P. 275–276° C. (dec.) after crystallization from absolute alcohol.

EXAMPLE XX

*N-(α-pyridyl)-N'-methylpiperazine*

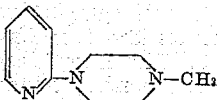

A mixture of 6.5 g. (0.04 mole) of N-(α-pyridyl)-piperazine of Example XIX, 9.2 g. (0.20 mole) of formic acid and 8.6 g. (0.10 mole) of formaldehyde is refluxed five hours. Excess hydrochloric acid is added to make the mixture acidic and the resulting solution is concentrated under reduced pressure. The residue is made basic with strong alkali and the basic product extracted with ether. The ether extracts are combined, dried, concentrated and distilled. There is thus obtained N-(α-pyridyl)-N'-methyl-piperazine, B. P. 106–107° C. at 2.7 mm. The dihydrochloride salt melts at 258–259° C. after crystallization from alcohol.

Compounds according to the invention have also been prepared in which R₁ is an alkyl group containing up to four carbon atoms inclusive, such as propyl, isopropyl and butyl. Examples for these compounds are: N-9-phenanthryl-methyl-N'-isopropylpiperazine and N-9-phenanthrylmethyl-N'-(n-butyl)-piperazine. R₁ may also be an alkanol group containing up to four carbon atoms inclusive. Illustrative of these compounds are: N-(α-naphthylmethyl)-N'-(γ-hydroxy-n-propyl)-piperazine and N-(β-naphthylmethyl)-N'-(δ-hydroxy-n-butyl) piperazine. R₃ and R₄ may be a lower alkyl group containing up to four carbon atoms. Illustrative of such compounds are: N-(9-phenanthrylmethyl)-N'-methyl-2,-n-propylpiperazine and N-(9-phenanthrylmethyl)-N'-methyl-2,-n-butylpiperazine.

The following examples are illustrative of the preparation of novel intermediates for the preparation of the final compounds according to the invention:

EXAMPLE XXI

*N-(9-fluorenyl)-N'-carbethoxypiperazine*

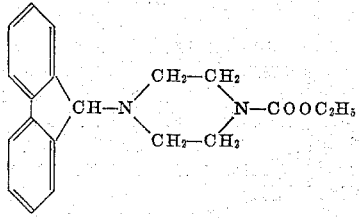

A mixture of 15.8 g. N-carbethoxypiperazine, 27 g. of 9-bromofluorine, and 5.8 g. of sodium carbonate in 100 cc. of butanol are heated in a steam bath for one hour. The product N-(9-fluorenyl)-N'-carbethoxypiperazine is formed having a melting point of 152–153° C. after crystallization from ethyl acetate. The monohydrochloride of this material melts at 219–220° C. with decomposition. The compound is an intermediate for the preparation of the compound of Example IX.

EXAMPLE XXII

*N,N'-dicarbethoxy-2,5-dimethylpiperazine*

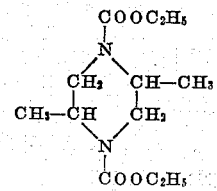

This compound is obtained as a by-product in the preparation of 1-carbethoxy-2,5-dimethylpiperazine. The preparation and constants for this compound are disclosed in Example XXXV.

EXAMPLE XXIII

*α-n-Propyl-p-chlorobenzyl chloride*

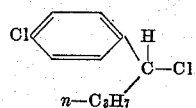

By reacting 49 g. of α-n-propyl-p-chlorobenzyl alcohol with gaseous hydrogen chloride there is obtained the above mentioned compound which boils at 101–103° C. at 1 mm. pressure.

EXAMPLE XXIV

*α-n-Propyl-p-chlorobenzyl carbinol*

About 56.2 g. of p-chlorobenzaldehyde is reacted with the Grignard Reagent prepared from 98.4 g. of n-propyl bromide and 19.2 g. of magnesium metal. After refluxing the mixture for two hours a solution of ammonium chloride is added to destroy the Grignard complex. The resulting carbinol is isolated by distillation, it boils at 113–114° C. at 1.4 mm. pressure. This compound is an intermediate for the preparation of the compound of Example XXIII.

EXAMPLE XXV

*2-(β-aminoethylamino)-cyclohexanol*

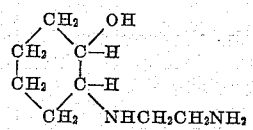

To a stirred solution of 1200 g. of 69.4% ethylenediamine in 1000 cc. of methanol, maintained at 45–55° C., is added dropwise over a period of four hours a solution of 200 g. of cyclohexene oxide in 100 cc. of methanol. Fractional distillation of the mixture yields the product, having the formula above, as a colorless oil which boils at 122–123° C. at 1.2 mm. The liquid sets to a greasy solid which melts at 47–51° C. after one recrystallization from ligroin. This amine forms a dihydrochloride in ether, which is recrystallized from absolute ethanol as white needles melting at 229–230° C. (dec.). This compound is an intermediate for the preparation of the compound of Example XXVI.

EXAMPLE XXVI

*Decahydroquinoxaline*

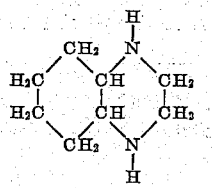

A mixture of 38 g. of 2-(β-aminoethylamino)-cyclohexanol, 7.5 g. of Raney nickel, and 200 pounds (cold) hydrogen is heated at 200° C. in a steel bomb with shaking for 6 hours. The resulting mixture is recrystallized once from dry ether, and then from low-boiling ligroin to constant melting point at 150–151° C. The product is in the form of white needles. A solution of the amine in ethanol when treated with etheareal hydrogen chloride gives the dihydrochloride, which recrystallizes from methanol as a white granular solid, melting-point 365° C. This compound is an intermediate for the preparation of compound of Example XXVII.

EXAMPLE XXVII

*N-carbethoxydecahydroquinoxaline*

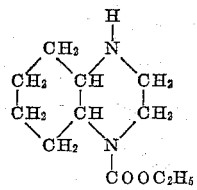

In the manner described in Example XXV, 15.4 g. of decahydroquinoxaline and 12 g. of ethyl chlorocarbonate react to form the compound represented by the above formula. The product is a colorless oil which boils at 107–109° C. at 0.6 mm. This compound is an intermediate for the preparation of the compound of Example XXVIII.

EXAMPLE XXVIII

*N-carbethoxy-N'-methyldecahydroquinoxaline*

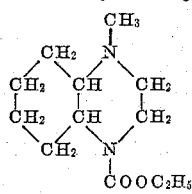

Following the procedure of Example IV, 19 g. of N-carbethoxydecahydroquinoxaline, 10.5 g. of anhydrous formic acid, and 7.5 g. of formalin react to give the compound having the structure above. The product is a colorless liquid which boils at 103–104° C. at 0.6 mm. This compound is an intermediate for the preparation of the compound of Example XXIX.

EXAMPLE XXIX

*N-methyldecahydroquinoxaline*

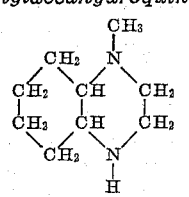

Hydrolysis of 17.5 g. of N-carbethoxy-N'-methyldecahydroquinoxaline with 36 cc. of 12 N hydrochloric acid in the usual manner yields the compound of the above structure. The product is a colorless oil which boils at 88–90° C. at 8 mm. This compound is an intermediate for the preparation of the final compound of Example XVI.

EXAMPLE XXX

*1,2-dimethyl-4-carbethoxypiperazine or 1,3-dimethyl-4-carbethoxypiperazine*

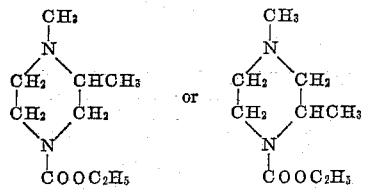

In the manner described in Example XX, 45 g. of the compound which is either 2-methyl-4-carbethoxypiperazine or 2-methyl-1-carbethoxypiperazine is combined with 30 g. of anhydrous formic acid and 23 g. of formalin. The product, which is represented by one of the above formulae, is a colorless oil which boils at 114° C. at 10 mm., $n_D^{26}=1.4633$. Since the exact structure of the intermediate was not determined, it is not possible to state which isomer is obtained in the example or in Examples XXXI–XXXIV and XIII–XIV.

EXAMPLE XXXI

*1,2-dimethylpiperazine or 1,3-dimethylpiperazine*

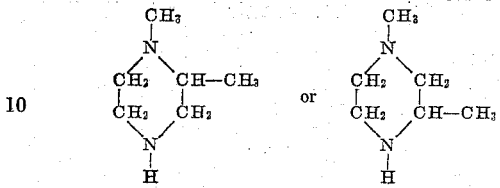

By the procedure of Example IX, 32.3 g. of the compound described in Example XXX and 78 cc. of 12 N hydrochloric acid react to give the product having one of the formulae above. The compound is a colorless oil which boils at 128–135° C. This compound is a useful intermediate for the preparation of the compound of Example XIII.

EXAMPLE XXXII

*1-carbethoxy-3,5-dimethylpiperazine or 1-carbethoxy-2,6-dimethylpiperazine*

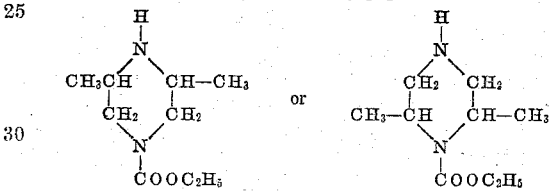

Following the procedure of Example XXXV, 40 g. of 2,6-dimethylpiperazine and 40 g. of ethyl chlorocarbonate are combined in an aqueous solution with the pH maintained at 3.5 to 4.0 by sodium acetate buffer, the compound represented by one of the above formulae, is obtained as a pale yellow oil which boils at 86–87° C. at 1.3 mm. This compound is an intermediate for the preparation of the compound of Example XXXIII.

EXAMPLE XXXIII

*1-carbethoxy-3,4,5-trimethylpiperazine or 1-carbethoxy-2,4-6-trimethylpiperazine*

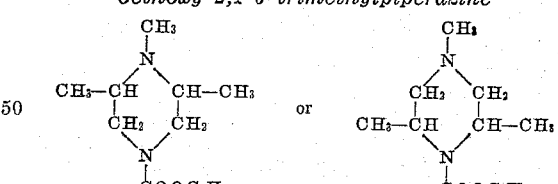

When 51.5 g. of the 1-carbethoxy-3,5-(or 2,6-) dimethylpiperazine described in the preceding example is methylated according to the process of Example XX with 32 g. of anhydrous formic acid and 23 g. of formalin, the compound represented by the appropriate one of the above formulae is obtained as a colorless oil which boils at 136° C. at 22 mm. This compound is an intermediate for the preparation of the compound of Example XXXIV.

EXAMPLE XXXIV

*1,2,6 - trimethylpiperazine or 1,3,5 - trimethylpiperazine*

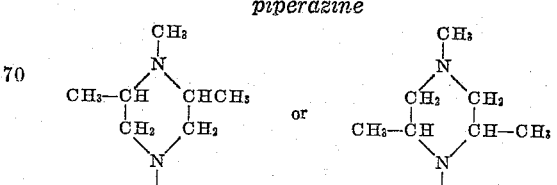

Hydrolysis of 36 g. of the compound described in the above example with 80 cc. of 12 N hydrochloric acid gives the product having the appropriate one of the above formulae. The product is a pale yellow oil which boils at 144° C. at 740 mm. This compound is a valuable intermediate for the preparation of the final product of Example XIV.

EXAMPLE XXXV

*1-carbethoxy-2,5-dimethylpiperazine*

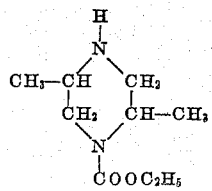

The pH of a solution of 24 g. of 2,5-dimethylpiperazine in 20 cc. of water is adjusted to 3.5, using bromphenol blue as an indicator, with 6 N hydrochloric acid. To the stirred solution is added 23 g. of ethyl chlorocarbonate dropwise over a period of 15 minutes. The pH of the reaction mixture is kept at 3.5 to 4.0 by the concurrent addition of saturated sodium acetate solution. When there is no longer any evidence of acid being liberated by the reaction, solid sodium hydroxide is added until the mixture is alkaline, and the oily product is collected with the aid of ether. The ethereal solution is dried over anhydrous sodium carbonate, and the product purified by distillation. The product represented by the formula above, is collected as a pale yellow oil which boils at 95° C. at 1.5 mm. A small amount of N,N'-dicarbethoxy-2,5-dimethylpiperazine, a white solid melting at 78° C., is collected as a by-product of the reaction. The compound 1-carbethoxy-2,5-dimethylpiperazine is an intermediate for the preparation of the compound of Example XXXVI.

EXAMPLE XXXVI

*1-carbethoxy-2,4,5-trimethylpiperazine*

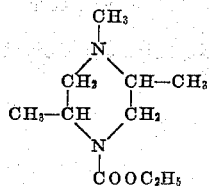

In the manner of Example XX, 19 g. of 1-carbethoxy-2,5-dimethylpiperazine is converted to the product represented by the above formula by the reaction with 11.8 g. of anhydrous formic acid, and 8.5 g. of formalin. The product is a colorless oil which boils at 115–116° C. at 12 mm. This compound is an intermediate for the preparation of the compound of Example XXXVII.

EXAMPLE XXXVII

*1,2,5-trimethylpiperazine*

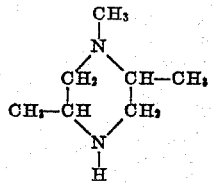

Hydrolysis of 12.7 g. of 1-carbethoxy-2,4,5-trimethylpiperazine by 28 cc. of 12 N hydrochloric acid gives the compound represented by the above formula. The product is a colorless oil which boils at 148° C. at 750 mm. This compound is a valuable intermediate for the preparation of the compound of Example XV.

It is noted that for some of the compounds having methyl substitution on the piperazine ring, the two alternatives are given as to the possible structure. This is necessitated by the fact that in starting with the dimethyl-substituted piperazine, it is difficult to determine to which nitrogen the substituents will add. However, in any event, one or both of the possible resulting compounds are produced.

The N,N'-disubstituted piperazines according to the invention are usually more soluble in water as salts and are therefore administered in the form of water-soluble salts when a rapid effect is desired. Any acid which produces a water soluble salt and does not appreciably enhance the toxicity is suitable for use. Such acids as sulphuric, phosphoric, hydrochloric, hydrobromic, levulinic, acetic and tartaric are among those which are satisfactory. Where a retarded effect is desired in obtaining the therapeutic results, salts of other non-toxic acids, such as tannic acid, which are very sparingly soluble in water, may be used. By using the latter salts the desired pharmacological effect will be slow in onset and relatively long in duration. The water soluble salts of these compounds of the invention may be satisfactorily administered in the form of water solutions. The bases and water insoluble salts, such as the tannic acid salt, as well as the water soluble salts, may be administered in the form of tablets and capsules. The following examples will illustrate these preparations.

EXAMPLE XXXVIII

N-(9-Fluorenyl)-N'-methylpiperazine hydrochloride _____ g__ 2
Distilled water, q. s. _____ cc__ 100

This formula produces an aqueous solution containing 20 mg. of medicament per cc. The compounds of the invention may be dispensed in aqueous solution in suitable concentrations according to this example.

EXAMPLE XXXIX

The salts of the therapeutic compounds according to the present invention may also be dispersed in the usual tablet and capsule bases and dispensed in tablet or capsule form. Convenient concentrations are 10, 25, 50 or 100 mg. per tablet or capsule.

Others may readily adapt the invention for use under various conditions of service, by employing one or more of the novel features disclosed, or equivalents thereof. As at present advised with respect to the apparent scope of our invention, we desire to claim the following subject matter.

We claim:

1. A compound selected from the group consisting of bases of the following formula:

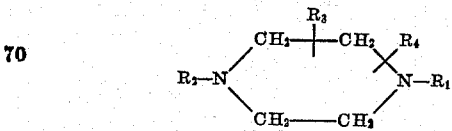

wherein $R_1$ is a member selected from the class consisting of hydrogen, an alkyl group containing up to 4 carbon atoms inclusive, an alkanol group containing up to 4 carbon atoms inclusive; $R_2$ is a member selected from the class consisting of diphenylethyl, naphthylmethyl, fluorenyl, phenanthrylmethyl and diphenylallyl groups; $R_3$ and $R_4$ are members selected from the class consisting of hydrogen and lower alkyl groups containing up to 4 carbon atoms inclusive; and acid addition salts thereof.

2. The compound N-naphthylmethyl-N'-$R_1$-piperazines wherein $R_1$ is an alkyl group containing up to 4 carbon atoms inclusive.

3. The compound N-fluorenyl-N'-$R_1$-piperazines wherein $R_1$ is an alkyl group containing up to 4 carbon atoms inclusive.

4. The compound N-($\beta,\beta$-diphenylethyl)-N'-$R_1$ is an alkyl group containing up to four carbon atoms inclusive.

5. The compound N-(9-phenanthrylmethyl)-$R_1$-piperazine wherein $R_1$ is an alkyl group containing up to four carbon atoms inclusive.

6. The compound N-($\gamma,\gamma$-diphenylallyl)-N'-$R_1$ is an alkyl group containing up to four carbon atoms inclusive.

7. The compound N-($\beta,\beta$-diphenylethyl)-N'-methylpiperazine.

8. The compound N-($\alpha$-naphthylmethyl)-N'-methylpiperazine.

9. The compound N-(9-fluorenyl)-N'-methylpiperazine.

10. The compound N-(9-phenanthrylmethyl)-N'-methylpiperazine.

11. The compound N-($\gamma,\gamma$-diphenylallyl)-N'-methylpiperazine.

12. The process for preparing the compound N-($\gamma,\gamma$-diphenylallyl)-N'-methylpiperazine which comprises mixing N-methylpiperazine with a $\gamma,\gamma$-diphenylallyl halide in an inert solvent under anhydrous conditions.

13. The process for preparing the compound N-($\beta,\beta$-diphenylethyl)-N'-methylpiperazine which comprises treating N-methylpiperazine with a $\beta,\beta$-diphenylethyl halide.

14. The process for preparing the compound N-(9-fluorenyl)-N'-methylpiperazine which comprises treating N-methylpiperazine with a 9-fluorenyl halide.

15. The process for preparing the compound N-(9-phenanthrylmethyl)-N'-methylpiperazine which comprises treating N-methylpiperazine with a 9-phenanthrylmethyl halide.

16. The process of preparing a compound having the general formula:

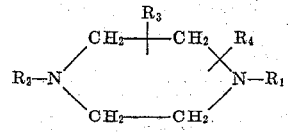

wherein $R_1$ is a member selected from the class consisting of hydrogen, an alkyl group containing up to 4 carbon atoms, inclusive, an alkanol group containing up to 4 carbon atoms, inclusive; $R_2$ is a member selected from the class consisting of diphenylethyl, naphthylmethyl, fluorenyl, phenanthrylmethyl, and diphenylallyl groups; and $R_3$ and $R_4$ are members selected from the class consisting of halogen and lower alkyl group containing up to 4 carbon atoms, inclusive; which comprises mixing an $R_1$-piperazine with an $R_2$-halide in an inert solvent under anhydrous conditions.

17. The process for preparing the compound N-($\beta,\beta$-diphenylethyl)-N'-methylpiperazine which comprises mixing an N-methylpiperazine with a $\beta,\beta$-diphenylethyl halide in an inert solvent under anhydrous conditions.

18. The process of preparing the compound N-(9-fluorenyl)-N'-methylpiperazine which comprises mixing N-methylpiperazine with 9-halofluorene in an inert solvent under anhydrous conditions.

19. The process for preparing the compound N-(9-phenanthrylmethyl)-N'-methylpiperazine which comprises mixing N-methylpiperazine with 9-chloromethylphenanthrene in an inert solvent under anhydrous conditions.

20. The process for preparing the compound N-($\alpha$-naphthylmethyl)-N'-methylpiperazine which comprises mixing N-methylpiperazine with N-$\alpha$-naphthylmethyl halide in an inert solvent under anhydrous conditions.

ARTHUR W. WESTON.
KENNETH E. HAMLIN, Jr.

No references cited.